(12) United States Patent
Downey

(10) Patent No.: US 10,253,556 B2
(45) Date of Patent: Apr. 9, 2019

(54) DAMPER FOR A COVERING FOR AN ARCHITECTURAL OPENING

(71) Applicant: Hunter Douglas Inc., Pearl River, NY (US)

(72) Inventor: Joseph M. Downey, Gilbert, AZ (US)

(73) Assignee: Hunter Douglas Inc., Pearl River, NY (US)

( * ) Notice: Subject to any disclaimer, the term of this patent is extended or adjusted under 35 U.S.C. 154(b) by 20 days.

(21) Appl. No.: 15/197,545

(22) Filed: Jun. 29, 2016

(65) Prior Publication Data

US 2018/0003256 A1 Jan. 4, 2018

(51) Int. Cl.
| | |
|---|---|
| *E06B 7/09* | (2006.01) |
| *F16F 9/14* | (2006.01) |
| *F16F 9/58* | (2006.01) |
| *E05F 5/00* | (2017.01) |

(52) U.S. Cl.
CPC ................ *E06B 7/09* (2013.01); *F16F 9/145* (2013.01); *F16F 9/585* (2013.01); *E05F 5/00* (2013.01); *E05Y 2201/266* (2013.01); *E05Y 2900/146* (2013.01)

(58) Field of Classification Search
CPC .................................. E06B 7/09; F16F 9/145
USPC .......................................... 188/290, 293, 296
See application file for complete search history.

(56) References Cited

U.S. PATENT DOCUMENTS

| | | | | |
|---|---|---|---|---|
| 2,027,423 A | * | 1/1936 | Gardiner ................... | E05F 3/14 16/58 |
| 4,653,141 A | * | 3/1987 | Converse .................. | E05F 3/14 16/82 |
| 4,723,639 A | * | 2/1988 | Hungerford ............ | F16F 9/145 188/307 |
| 4,756,051 A | * | 7/1988 | Shy ........................... | E05F 3/14 16/299 |
| 4,768,630 A | * | 9/1988 | Aubry ....................... | F16F 9/10 188/276 |

(Continued)

FOREIGN PATENT DOCUMENTS

| | | |
|---|---|---|
| JP | 2004052865 | 2/2004 |
| JP | 2013007414 | 1/2013 |

(Continued)

OTHER PUBLICATIONS

United Kingdom Intellectual Property Office International Search Report for Application No. GB1710333.4, dated Dec. 5, 2017 (3 pages).

*Primary Examiner* — Catherine A Kelly
(74) *Attorney, Agent, or Firm* — Dority & Manning, P.A.

(57) ABSTRACT

A damper providing varying damping force is provided. The damper may include a housing and a rotary member rotatably received the housing. The rotary member may rotate within the housing between defined end points of travel to define an angular range of travel of the rotary member. An outermost surface of the rotary member may be spaced inwardly from an inner surface of the housing defined between the end points of travel to define a gap between the outermost surface of the rotary member and the inner surface of the housing throughout the angular range of travel. The gap may vary in dimension depending on a rotational position of the rotary member to provide varying damping rates within the angular range of travel of the rotary member.

22 Claims, 15 Drawing Sheets

(56) References Cited

U.S. PATENT DOCUMENTS

| | | | |
|---|---|---|---|
| 5,152,189 A | 10/1992 | Miura et al. | |
| 5,305,858 A * | 4/1994 | Haga | F16F 9/145 188/271 |
| 5,601,165 A * | 2/1997 | Oppitz | B60G 21/0555 188/296 |
| 5,697,122 A * | 12/1997 | Okabe | E05F 3/14 16/82 |
| 6,213,881 B1 * | 4/2001 | Sasa | F16F 9/145 16/50 |
| 6,264,264 B1 * | 7/2001 | Kato | B60J 3/0265 296/97.12 |
| 6,390,255 B2 * | 5/2002 | Kobori | F16F 9/145 188/290 |
| 6,393,624 B1 * | 5/2002 | Iwashita | A47K 13/12 16/54 |
| 6,666,252 B2 | 12/2003 | Welfonder | |
| 6,840,356 B2 * | 1/2005 | Nishiyama | F16F 9/145 16/51 |
| 6,854,505 B2 | 2/2005 | Grubb et al. | |
| 6,913,125 B2 * | 7/2005 | Hayashi | F16D 57/02 16/51 |
| 7,111,712 B2 * | 9/2006 | Orita | F16F 9/145 188/290 |
| 7,275,626 B2 * | 10/2007 | Fukuzawa | A47K 13/12 16/54 |
| 7,343,646 B2 * | 3/2008 | Hayashi | E05B 85/18 16/412 |
| 7,416,063 B2 * | 8/2008 | Araki | F16F 9/145 16/54 |
| 7,461,683 B2 | 12/2008 | Wang | |
| 7,628,258 B2 * | 12/2009 | Athanasiou | B62D 7/224 188/296 |
| 7,828,127 B2 * | 11/2010 | Jeffries | F16F 9/145 188/290 |
| 7,836,550 B2 * | 11/2010 | Lin | E05F 3/14 16/303 |
| 7,866,001 B2 * | 1/2011 | Honda | B60J 5/103 16/307 |
| 2003/0155196 A1 * | 8/2003 | Nishiyama | F16F 9/145 188/290 |
| 2009/0151121 A1 * | 6/2009 | Lin | E05F 3/20 16/321 |
| 2012/0152470 A1 * | 6/2012 | Chen | E06B 9/42 160/292 |
| 2014/0102840 A1 * | 4/2014 | Cho | F16F 9/145 188/281 |

FOREIGN PATENT DOCUMENTS

| | | | | |
|---|---|---|---|---|
| WO | WO 2014/142932 | | 9/2014 | |
| WO | WO-2014142932 A1 * | | 9/2014 | E06B 7/10 |

* cited by examiner

DAMPER FOR A COVERING FOR AN ARCHITECTURAL OPENING

TECHNICAL FIELD

This disclosure relates generally to a damper for a covering for an architectural opening, and more specifically to a damper providing a varying damping force.

BACKGROUND

Coverings for architectural openings, such as windows, doors, archways, and the like, have taken numerous forms for many years. Some coverings include one or more shade members that are movable between an open position and a closed position. Generally, it is desirable for the one or more shade members to move in a relatively quiet manner. However, the one or more shade members do not always move in such a desired manner. For example, shutter panels generally include multiple louvers or slats that rotate between open and closed positions. Moving the louvers into a closed position sometimes creates undesirable noise as the louvers contact one another, especially in shutter panels where the louvers are driven shut by a driving mechanism.

BRIEF SUMMARY

The present disclosure generally provides a damper that offers improvements and/or an alternative to existing dampers for an architectural covering. The damper generally provides multiple or varying levels of damping between defined end points of travel. In some arrangements, the damper provides increased damping adjacent the end points of travel and decreased damping therebetween. When associated with a louver of a shutter panel, the damper may be configured to control the rate of closure of the louver near its end points of travel while permitting relatively unrestricted movement between its end points of travel. By controlling the rate of closure of the louver near its end points of travel, the damper reduces undesirable noise caused by adjacent louvers contacting one another.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements illustrated herein.

BRIEF DESCRIPTION OF THE DRAWINGS

The accompanying drawings, which are incorporated into and constitute a part of the specification, illustrate embodiments of the disclosure and, together with the general description above and the detailed description below, serve to explain the principles of these embodiments.

DETAILED DESCRIPTION

Figure 1:
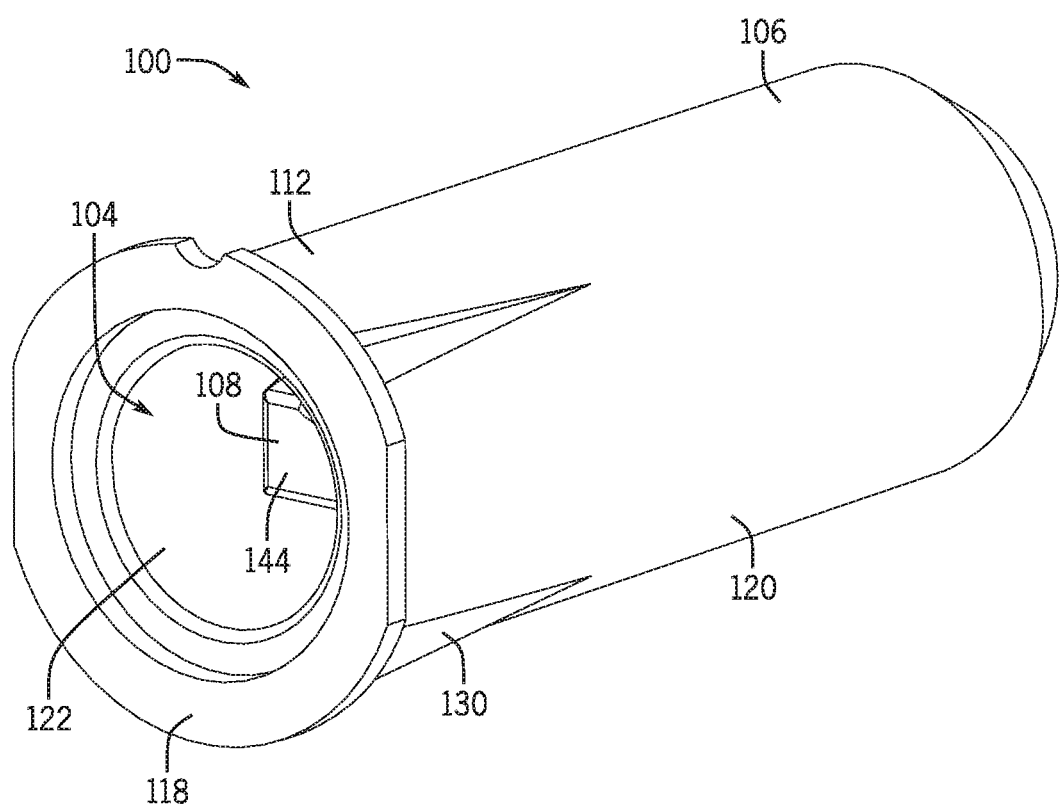
FIG. 1 is a perspective view of a damper for an architectural covering in accordance with an embodiment of the present disclosure.

FIG. 1 illustrates a damper 100 according to an illustrative embodiment of the present disclosure. The damper 100 of the illustrative embodiment is configured to interface with an external component 102 or drive member (e.g. a louver pin) (see FIG. 3) that transfers rotation to the damper 100, and to which the damper 100 imparts a resistive force to control a rate of movement of the external component 102 (see FIG. 3). The damper 100 may resist rotational movement of the external component 102 about a longitudinal axis L of the damper 100 (see FIG. 2). The damper 100 may include an opening 104 defined in an end of the damper 100 configured to receive a portion of the external component 102 (see FIG. 4).

Figure 4:
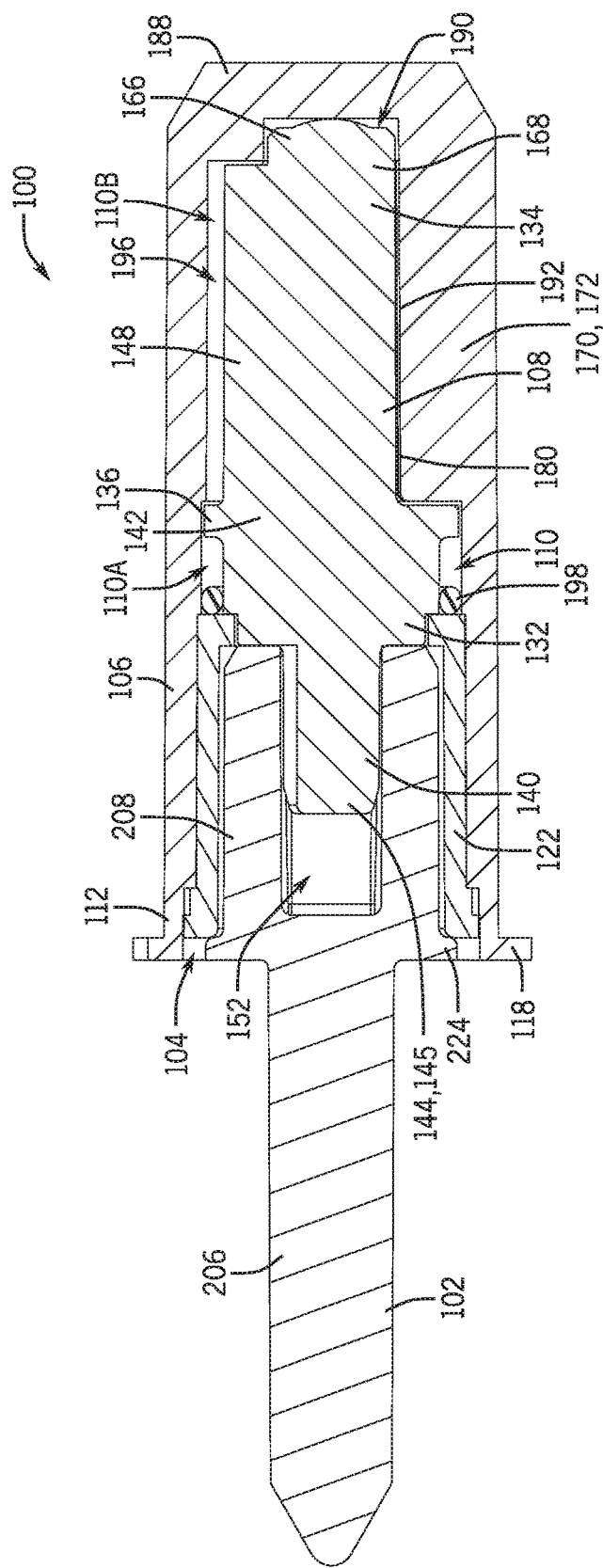
FIG. 4 is an axial cross-sectional view of the damper of FIG. 3 taken along section line A-A of FIG. 3 in accordance with an embodiment of the present disclosure.

With reference to FIGS. 2 and 4-11, the damper 100 of the illustrative embodiment includes a housing 106 and a rotary member 108 rotatably received at least partially in the housing 106. Referring to FIGS. 4-11, the housing 106 may be substantially hollow and may define an internal cavity 110 for receiving the rotary member 108. As best seen in FIG. 4, in some embodiments, the cavity 110 may include a first cavity section 110A and a second cavity section 110B, each of the first and second cavity sections 110A, 110B sized and shaped to receive complimentary portions of the rotary member 108, as detailed more fully below. The housing 106 may be formed as an elongate tube having at least one open end (e.g., a first end 112) for insertion of the rotary member 108 and/or at least a portion of the external component 102 therein. With reference to the embodiments of FIGS. 2 and 4, the rotary member 108 and at least a portion of the external component 102 may be inserted into one end (e.g., a first end 112) of the housing 106. To secure the rotary member 108 within the housing 106, the damper 100 may include a sleeve 122 inserted within the opening 104 (see FIGS. 2 and 4). In the illustrative embodiment shown in FIG. 4, once the sleeve 122 is inserted within the opening 104 to a fully seated position, the sleeve 122 may abut a portion of the rotary member 108 to limit axial movement of the rotary member 108 out of the housing 106. In some embodiments, the sleeve 122 may be attached (e.g., through heat or sonic welding, adhesive, threaded engagement, or the like) to an interior portion of the housing 106 adjacent its first end 112. The sleeve 122 may be substantially cylindrical having a circular cross-section (see FIG. 2, for instance); however, other cross-section shapes, such as square, rectangle, elliptical, or other shapes, are also within the scope of the disclosure.

As illustrated in FIG. 1, the first end 112 of the housing 106 may include a circumferential flange 118 extending outwardly from an outer surface 120 of the housing 106. The flange 118 may be used to restrict insertion of the damper 100 into a structure, such as a frame member of a shutter panel (see FIGS. 12 and 13). One or more buttresses 130 may extend between and be attached to the flange 118 and the outer surface 120 of the housing 106. The buttresses 130 may increase the structural rigidity of the flange 118, for instance. The buttresses 130 may engage the structure, such as the frame member of a shutter panel, to restrict rotation of the housing 106 relative to the structure. The outer surface 120 of the housing 106 may be substantially cylindrical having a circular cross-section (see FIG. 5, for instance); however, other cross-section shapes, such as square, rectangle, elliptical, or other shapes, are also within the scope of the disclosure.

Figure 2:
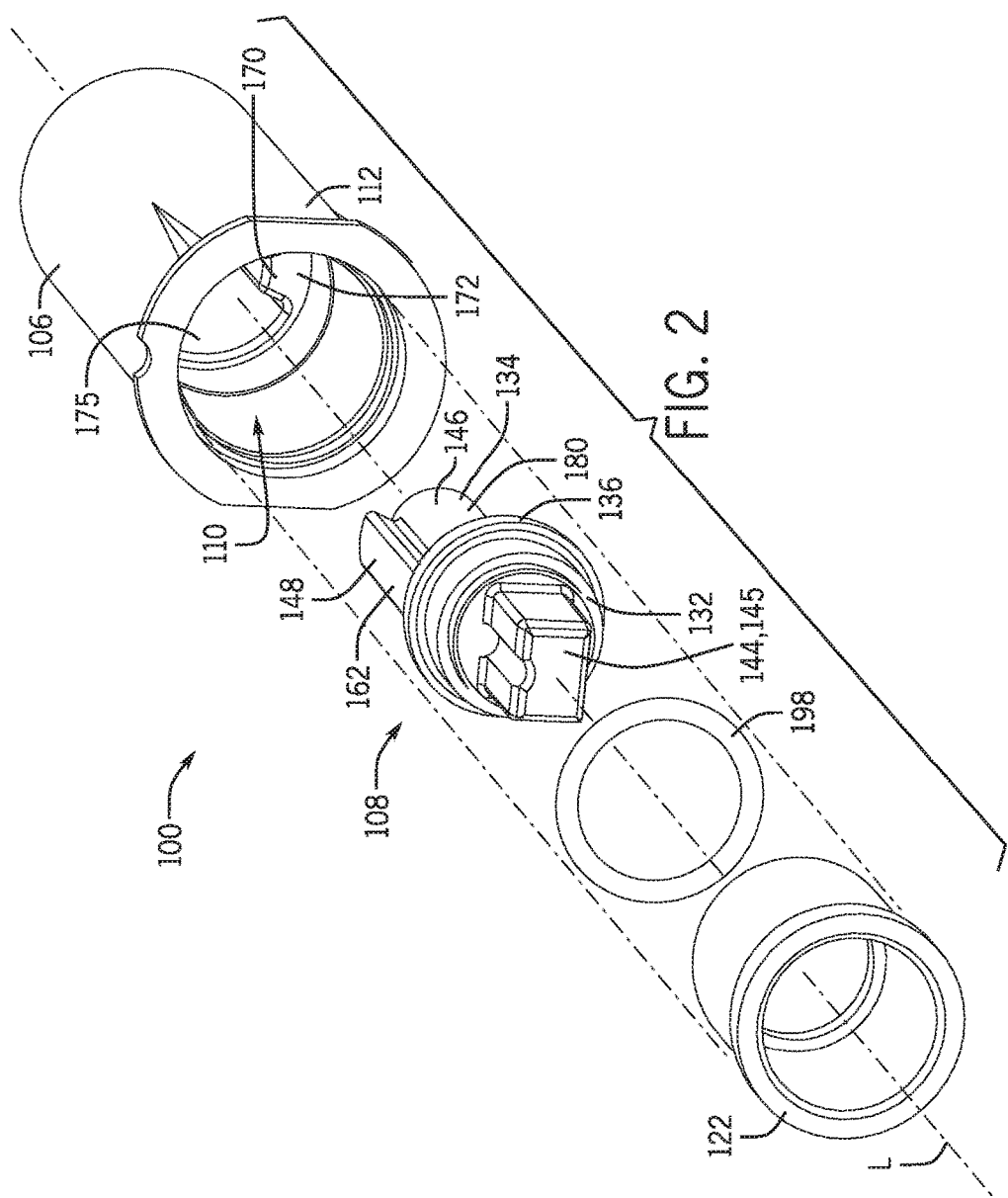
FIG. 2 is an exploded view of the damper of FIG. 1 in accordance with an embodiment of the present disclosure.

With reference to FIGS. 2 and 4, the rotary member 108 may be an elongate member including a first portion 132, a second portion 134, and a partition 136 positioned between the first and second portions 132, 134. Referring to FIG. 4, the first portion 132 of the rotary member 108 may be rotatably received within the first cavity section 110A. Referring back to FIGS. 2 and 4, the first portion 132 may be generally cylindrical and may include a first end 140 and a second end 142. The first end 140 may be positioned adjacent the first end 112 of the housing 106, and the second end 142 of the first portion 132 of the rotary member 108 may be attached to the partition 136. An engagement structure 144 may be defined in or on the first end 140 of the rotary member 108 to couple the rotary member 108 to the external component 102. For example, the engagement structure 144 may be a protrusion 145 extending from the first end 140 away from the second end 142 of the rotary member 108. The engagement structure 144 may have a substantially rectangular cross-section, as shown in FIG. 2; however, other cross-section shapes such as square, circular, elliptical, polyhedral, or other shapes are also within the scope of the disclosure. In such embodiments, the engagement structure 144 of the rotary member 108 may engage a complimentary-sized portion of the external component 102 to, for example, cause the rotary member 108 and the external component 102 to rotate in unison, as explained further below. For example without limitation, the protrusion 145 may be inserted at least partially within a complimentary-sized cavity 152 defined in the external component 102 (see FIG. 4). The partition 136 may have a circular cross-section that is concentrically larger than the first portion 132 and/or the second portion 134 of the rotary member 108.

Figure 5:
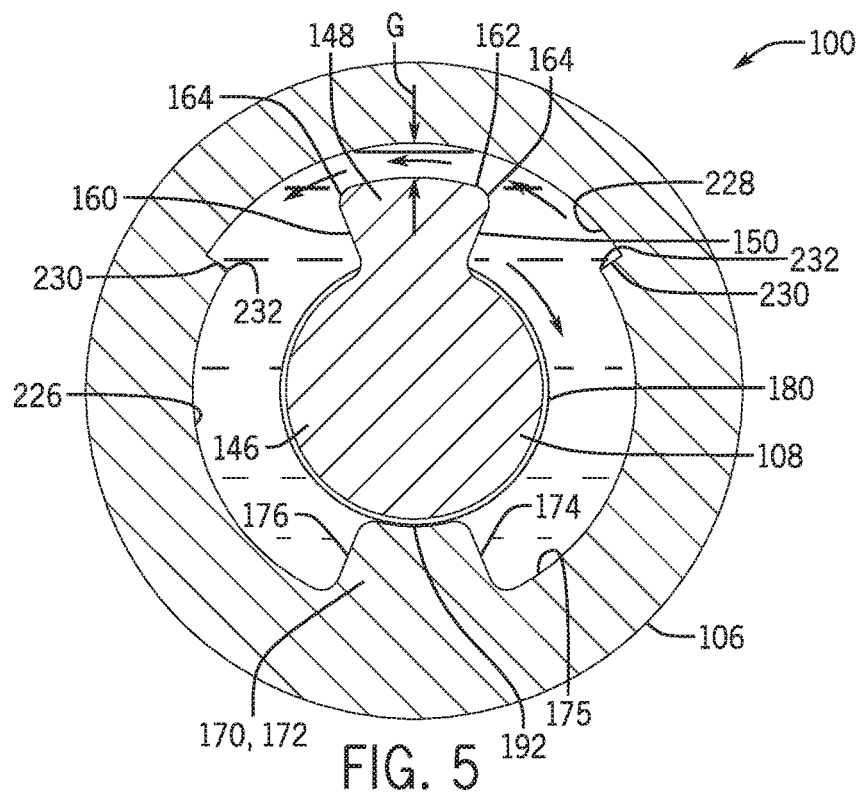
FIG. 5 is a transverse cross-sectional view of the damper of FIG. 3 in a reduced damping state, FIG. 5 taken along section line B-B of FIG. 3 in accordance with an embodiment of the present disclosure.

With continued reference to FIGS. 2 and 4, the second portion 134 of the rotary member 108 may be attached to the partition 136 opposite the first portion 132. In such embodiments, the second portion 134 may be rotatably received within the second cavity section 110B, which may include an outer diameter smaller than that of the first cavity section 110A (see FIG. 4). Referring to FIGS. 5-11, the second portion 134 of the rotary member 108 may include a cylindrical shaft 146 and a fin 148 extending radially from and about a portion of the shaft 146. The fin 148 of the illustrative embodiment extends only partially about the circumference of the shaft 146 and includes first and second abutment surfaces 150, 160. In the embodiment illustrated in FIG. 5, the fin 148 extends less than 90 degrees about the shaft 146 such that the rotary member 108 may rotate within the housing 106 greater than 270 degrees between defined end points of travel, as more fully described below. The angles mentioned above are for illustration purposes only, and other angular ranges of travel are within the scope of the disclosure. The first and second abutment surfaces 150, 160, which may be planar in some embodiments, extend away from the shaft 146 and towards an outermost surface 162 of the fin 148, the outermost surface 162 being defined by a constant radius in some embodiments. The transition between the outermost surface 162 and each of the first and second abutment surfaces 150, 160 defines leading edges 164 of the fin 148. The leading edges 164 may be rounded as depicted in FIG. 5, for instance, or may be sharp depending, for example, on the desired damping characteristics of the damper 100, as explained below. Referring to FIG. 2, the radius defining the outermost surface 162 of the fin 148 may be less than or equivalent to the radius defining the partition 136. Referring to FIG. 4, a boss 166 may extend from an axial end 168 of the shaft 146 opposite the first end 140 to rotatably support the rotary member 108 within the housing 106 in conjunction with the partition 136 and/or the first portion 132, as detailed hereafter. As explained below, the second portion 134 of the rotary member 108 may provide a variable damping force or rate as the rotary member 108 rotates within the housing 106.

Referring to FIGS. 5-11, the rotary member 108 may be rotatably received in the housing 106 such that the rotary member 108 rotates within the housing 106 between defined end points of travel to define an angular range of travel of the rotary member 108. Referring to FIG. 2, the damper 100 may include a stop 170 that, in conjunction with the fin 148, structurally defines the end points of travel of the rotary member 108 within the housing 106. For example, in the illustrative embodiment of FIGS. 2 and 4-11, the stop 170 includes a rib 172 positioned within the rotational path of the rotary member 108 to prevent full circular movement of the rotary member 108 within the housing 106. In the embodiments of FIGS. 4-11, the stop 170 (e.g., the rib 172) may be monolithically formed as part of the housing 106 such that the stop 170 and the housing 106 are integrally formed together. The rib 172 may extend from an inner surface 175 of the housing 106 to the cylindrical shaft 146 of the rotary member 108 such that the rib 172 supports the shaft 146 during rotation of the rotary member 108 within the housing 106. The rib 172 may extend lengthwise along substantially the entire length of the cylindrical shaft 146 of the rotary member 108 (see FIG. 4).

With continued reference to FIGS. 5-11, the rib 172 may include first and second limit surfaces 174, 176 that may define the end points of travel of the rotary member 108. For example, the stop 170 may be positioned within the housing 106 such that the first and second abutment surfaces 150, 160 of the fin 148 alternately contact the first and second limit surfaces 174, 176 of the rib 172, respectively, to define the angular range of travel of the rotary member 108, as explained in more detail below. The rib 172 may be generally trapezoidal in cross-section, as illustrated in FIGS. 2 and 5-11, or have other cross-sectional shapes, such as rectangular, square, triangular, or other suitable shapes having opposing surfaces capable of defining the end points of travel of the rotary member 108. With reference to FIGS. 4-11, the rib 172 may include a bearing surface 192 to rotatably support the second portion 134 (e.g., the shaft 146) of the rotary member 108 within the housing 106. During operation, at least a portion (e.g., an outer surface 180) of the shaft 146 may slidably engage the bearing surface 192 of the rib 172 as the rotary member 108 rotates within the housing 106. In some embodiments, a bearing cavity 190 may be defined in a bottom wall 188 of the housing 106 to rotatably receive the boss 166 of the rotary member 108 and rotatably support at least the second portion 134 of the rotary member 108 (see FIG. 4).

Referring to FIGS. 2 and 4, the housing 106, the rotary member 108, and the sleeve 122 may be aligned along the longitudinal axis L of the damper 100. Referring to FIG. 4, once assembled, the housing 106 may define a fluid-filled cavity 196 such that the rotary member 108 is received at least partially in the fluid-filled cavity 196 (e.g., in FIG. 4, the second portion 134 of the rotary member 108 is received in the fluid-filled cavity 196) and the rib 172 projects inwardly from the inner surface 175 of the housing 106 within the fluid-filled cavity 196. To seal the fluid-filled cavity 196, at least one O-ring 198 may be inserted within the damper 100 between the housing 106 and the rotary member 108. For example, an O-ring 198 may be positioned on the first portion 132 of the rotary member 108 between the sleeve 122 and the partition 136 such that the O-ring 198 is in sealing engagement between the housing 106 and the rotary member 108 (see FIG. 4).

Figure 3:
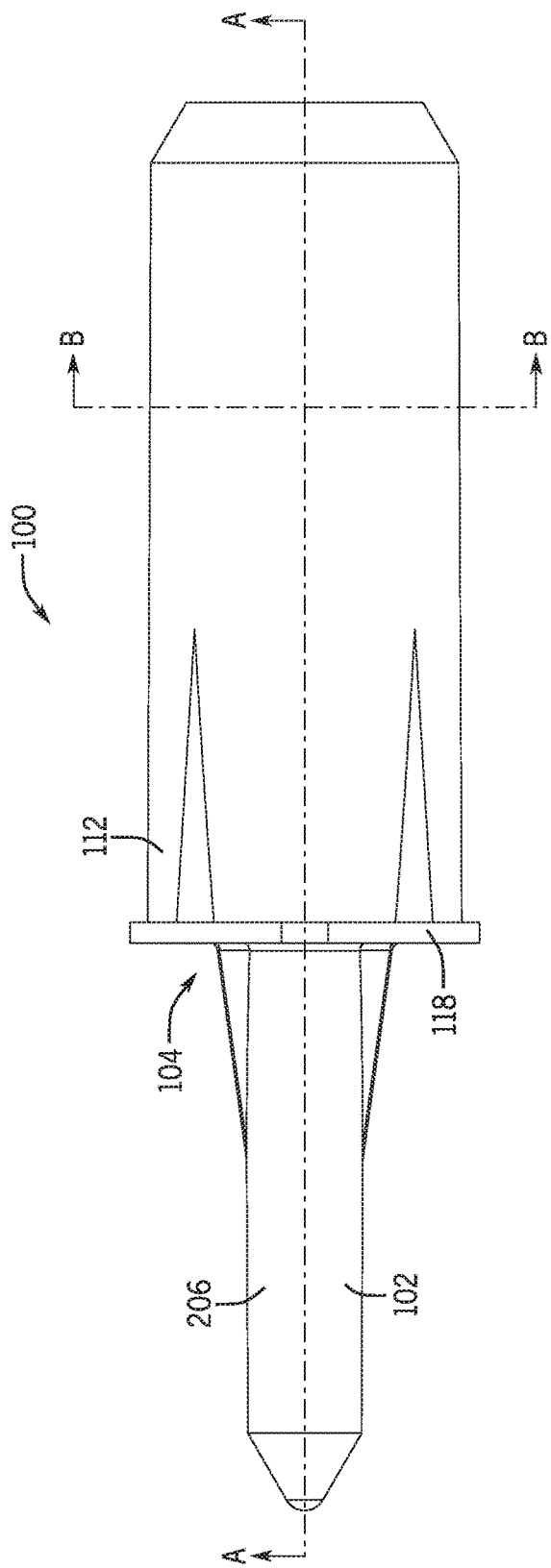
FIG. 3 is an elevation view of a damper with a drive member associated therewith in accordance with an embodiment of the present disclosure.

With reference to FIGS. 3 and 4, the damper 100 may control or resist rotational movement of a component of an architectural covering. For example, the damper 100 may resist rotation of the external component 102 inserted at least partially within the damper 100 and coupled to the rotary member 108. As shown in FIG. 3, the external component 102 or drive member, such as the depicted louver pin 206, may project axially from the first end 112 of the housing 106 (e.g., from the flange 118), and, in some embodiments, may be axially aligned with the damper 100. As best seen in FIG. 4, the louver pin 206 may include an engagement portion 208 sized for both receipt within the opening 104 formed in the housing 106 and corresponding engagement with the engagement structure 144 of the rotary member 108. In some embodiments, the louver pin 206 may include a limit flange 224 to define the seated position of the louver pin 206 within the damper 100. For instance, in the embodiment of FIG. 4, the limit flange 224 includes dimensions larger than the opening of the sleeve 122 to limit the louver pin 206 from being over-inserted into the damper 100. Though described with reference to a louver pin 206, external components or drive members other than louver pins may be used in association with the damper 100.

With reference to FIGS. 5-11, the rotary member 108 and the housing 106 are operable to provide variable damping forces or rates as the rotary member 108 rotates within the housing 106 between the end points of travel. As illustrated in FIGS. 5-11, the outermost surface 162 of the rotary member 108 is spaced inwardly from the inner surface 175 of the housing 106 to define a gap G between the outermost surface 162 of the rotary member 108 and the inner surface 175 of the housing 106 throughout the angular range of travel of the rotary member 108. To provide variable damping forces or rates, the gap G varies in dimension depending on the rotational position of the rotary member 108. For example, the gap G may vary from a relatively small dimension when the fin 148 is positioned adjacent the stop 170 (see FIGS. 7 and 10) to a relatively large dimension when the fin 148 is positioned a distance away from the end points of travel (see FIGS. 5, 6, and 9) (e.g., substantially midway between the end points of travel). In some embodiments, the gap G may be relatively small along a first region of the inner surface 175 adjacent the stop 170 and may be relatively large along a second region of the inner surface 175 spaced away from the stop 170 such that damping of the rotary member 108 varies as the rotary member 108 rotates with respect to the stop 170. For example, the damping rate of the rotary member 108 within the housing 106 may be relatively low with distance away from the stop 170 (see FIG. 5) and may increase as the rotary member 108 (e.g., the fin 148) approaches the stop 170 (see FIGS. 6-8, for instance, in progression), as explained further hereafter. In other words, the gap G may decrease in dimension near the end points of travel to provide increased damping rates at such locations, as explained below. In the illustrative embodiments of FIGS. 5-11, no structural member is positioned between the outermost surface 162 of the rotary member 108 and the inner surface 175 of the housing 106. In these illustrative embodiments, only fluid is disposed between the outermost surface 162 of the rotary member 108 and the inner surface 175 of the housing 106 regardless of the position of the rotary member 108 within the housing 106.

With reference to FIG. 5, the inner surface 175 of the housing 106 may be configured to provide the variable damping forces or rates of the damper 100. As illustrated in FIG. 5, the inner surface 175 of the housing 106 may include a change in dimension such that a radial dimension distance between the outer surface 162 of rotary member 108 and the inner surface 175 of the housing 106 (e.g., the gap G) varies throughout the angular range of travel of the rotary member 108. For example, the inner surface 175 may include a first portion 226 defined by a first radius and a second portion 228 defined by a second radius. The first radius may be less than the second radius to define a transition 230 between the first and second portions 226, 228. In some embodiments, the transition 230 may be positioned relative to (e.g., adjacent) the stop 170 to achieve a desired variable damping characteristic of the damper 100, as explained in more detail below. For example, the distance at which the transition 230 is positioned relative to the stop 170 may determine at which point the damper 100 provides increased damping rates or forces. For instance, the closer the transition 230 is positioned to the stop 170, the less range of angular travel the damper 100 is able to provide increased damping of the rotary member 108, and vice-versa (compare FIG. 5 and FIG. 18). In the illustrative embodiment of FIG. 5, the transition 230 between the first portion 226 and the second portion 228 may define edges 232 such that the inner surface 175 may be considered stepped. The edges 232 may be abrupt or sharp as depicted in FIG. 5 or may be rounded or smooth depending, for example, on the desired damping characteristics of the damper 100, as explained below. In the embodiment illustrated in FIG. 5, the rib 172 projects inwardly from the first portion 226 of the inner surface 175. As depicted in FIG. 5, the rib 172 may project inwardly from a middle of the first portion 226 such that the rib 172 is surrounded on both sides by the first portion 226 of the inner surface 175. As detailed below, the transition 230 may provide differing damping rates depending on the position of the damper 100, and more particularly, the rotational position of the rotary member 108 in relation to the transition 230. When combined with other components of an architectural covering (e.g., a louver of a shutter panel), the damper 100 may provide variable damping rates corresponding with particular positions or configurations of the covering.

Figure 14:
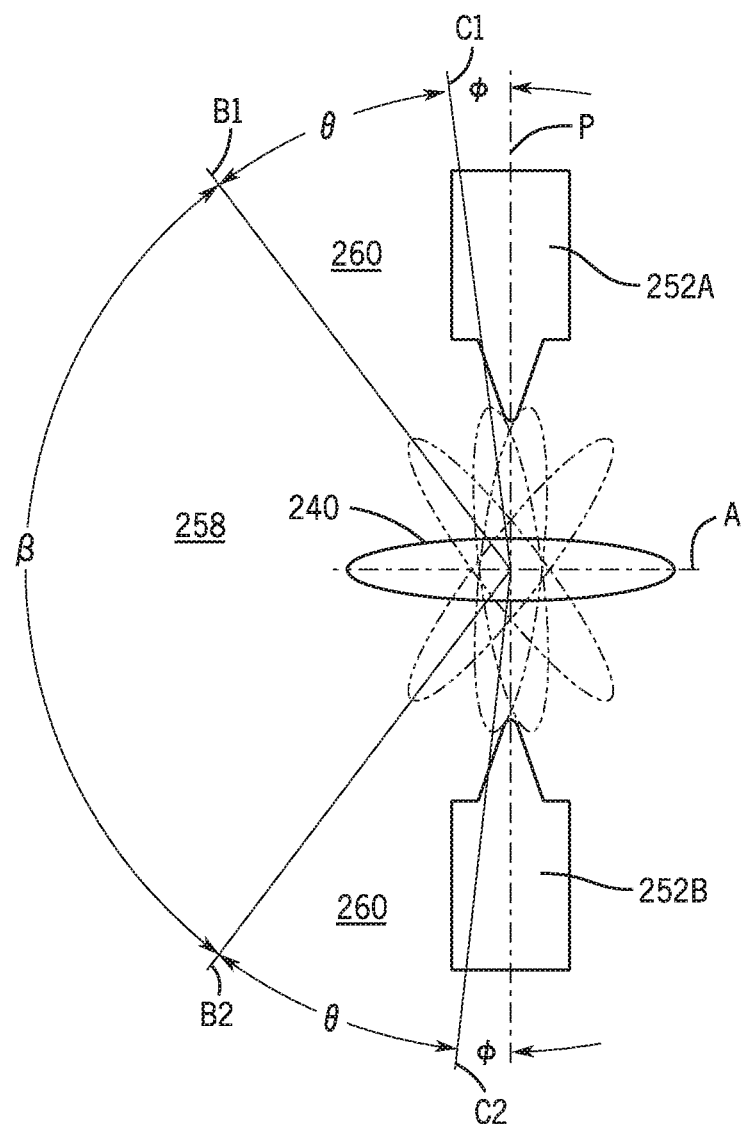
FIG. 14 is a transverse cross-sectional view of a louver of the shutter panel of FIG. 12 in accordance with an embodiment of the present disclosure. The louver is illustrated in solid lines in a fully-opened position, and in broken lines in a partially-opened position and a fully-closed position.
Figure 15:
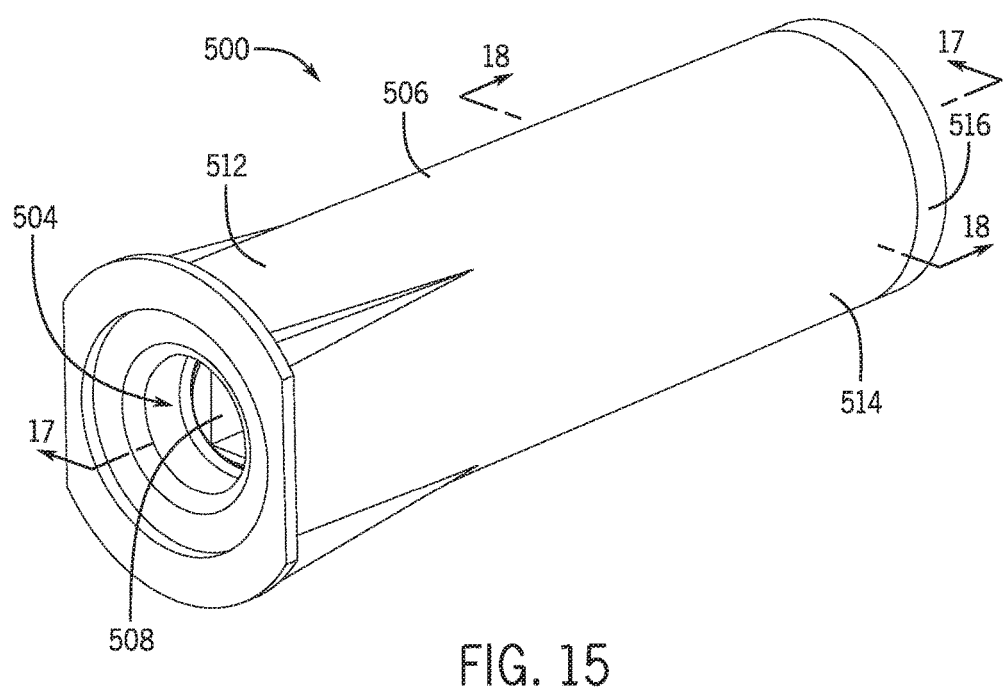
FIG. 15 is a perspective view of an additional damper for an architectural covering in accordance with an embodiment of the present disclosure.

For example, with continued reference to FIG. 5, the damper 100 is depicted in a first position, which may correspond to a fully-opened louver position (position A in FIG. 14). In the first position, the rotary member 108 and the housing 106 may be oriented relative to each other so the fin 148 of the rotary member 108 is rotationally spaced sufficiently away from the transition 230 of the housing 106 such that the transition 230 contributes negligibly to the damping characteristics of the damper 100 in the first position. In the first position, the damping rate of the damper 100 may be reduced as fluid may flow with relative ease through the gap G defined between the outermost surface 162 of the fin 148 and the second portion 228 of the inner surface 175 of the housing 106. Because the damper 100 is sealed, rotating the rotary member 108 relative to the housing 106 in one direction causes the fluid within the fluid-filled cavity 196 to flow in an opposite direction, such as against the fin 148 and along the outermost surface 162 of the rotary member 108, to equalize the pressures at the opposing sides of the fin 148, thereby providing a degree of damping against the rotational movement of the rotary member 108 within the housing 106. In this manner, the fluid within the housing 106 flows in a direction opposite the direction of rotation of the rotary member 108, regardless of which direction the rotary member 108 is rotated. For example, rotating the rotary member 108 in a first direction (e.g., clockwise in FIG. 5) causes fluid to flow in a second direction (e.g., counter-clockwise in FIG. 5) substantially opposite the first direction. Similarly, rotating the rotary member 108 in the second direction causes fluid to flow in the first direction.

Figure 6:
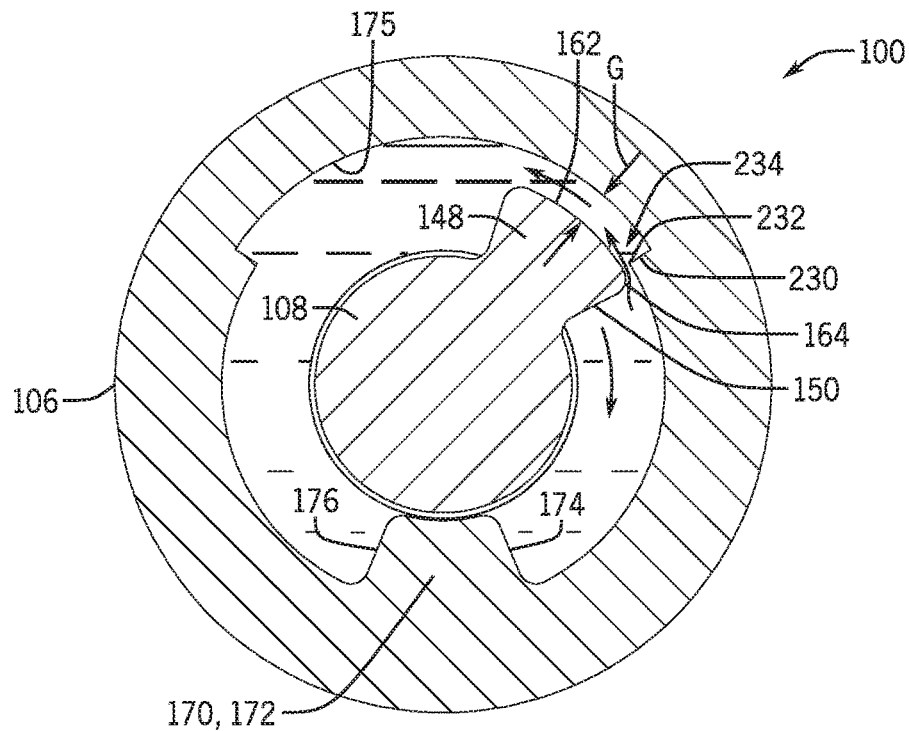
FIG. 6 is a transverse cross-sectional view of the damper of FIG. 3 in a transitional damping state, FIG. 6 taken along section line B-B of FIG. 3 in accordance with an embodiment of the present disclosure.
Figure 9:
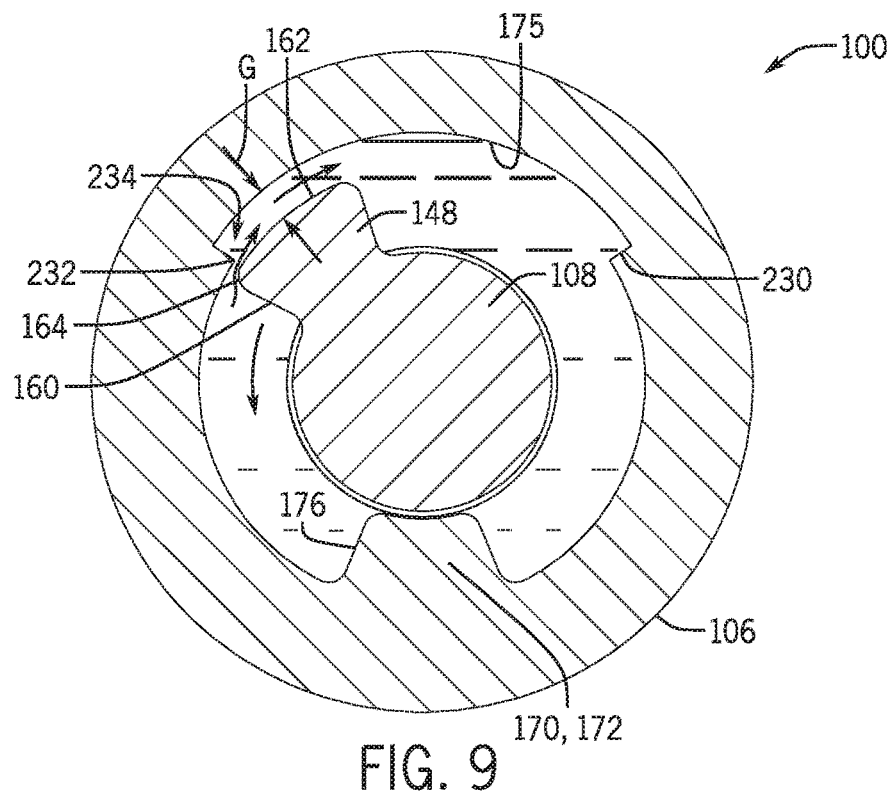
FIG. 9 is a transverse cross-sectional view of the damper of FIG. 3 in a transitional damping state, FIG. 9 taken along section line B-B of FIG. 3 in accordance with an embodiment of the present disclosure.

With reference to FIGS. 6 and 9, the damper 100 is depicted in a second position, which may correspond to a partially-closed louver position (position B1 or B2 in FIG. 14). FIGS. 6 and 9 do not depict the rotary member 108 in the same rotational position; however, the configurations of the damper 100 in FIGS. 6 and 9 are functionally equivalent, albeit in a mirrored configuration. For example, in the second position, the rotary member 108 and the housing 106 may be oriented such that the fin 148 of the rotary member 108 is adjacent the transition 230 of the housing 106. As shown in FIGS. 6 and 9, as the fin 148 rotates towards the transition 230, a narrowing constriction 234 is created between one of the leading edges 164 of the fin 148 and one of the edges 232 of the transition 230. The damping rate provided in the second position may be higher compared to the damping rate provided in the first position as fluid must flow through the narrowing constriction 234 created between the fin 148 and the transition 230. For example, rotating the rotary member 108 in a first direction (clockwise in FIG. 6 and counter-clockwise in FIG. 9) may increase the damping rate as fluid must flow through the narrowing constriction 234. As noted above, the shape of the edges 232 of the transition 230 and/or the leading edges 164 of the fin 148 may affect the damping characteristics of the damper 100 in at least the second position. For instance, a hard or sharp edge may provide a distinct transition between the damping rates of the first position and those of the second position such that a user may readily notice the increased damping rate as the rotary member 108 rotates into the second position. Additionally or alternatively, a hard or sharp edge may increase the damping rate uniformly throughout the angular range of travel of the rotary member 108 as a hard or sharp edge increases drag by resisting fluid flow about the rotary member 108. In the embodiments described herein, the damping rate may increase linearly or non-linearly as the rotary member 108 is rotated towards the transition 230. As in FIG. 5, rotation of the rotary member 108 in a first direction (clockwise in FIG. 6 and counter-clockwise in FIG. 9) causes fluid to flow in a second direction (counter-clockwise in FIG. 6 and clockwise in FIG. 9) substantially opposite the first direction.

Figure 7:
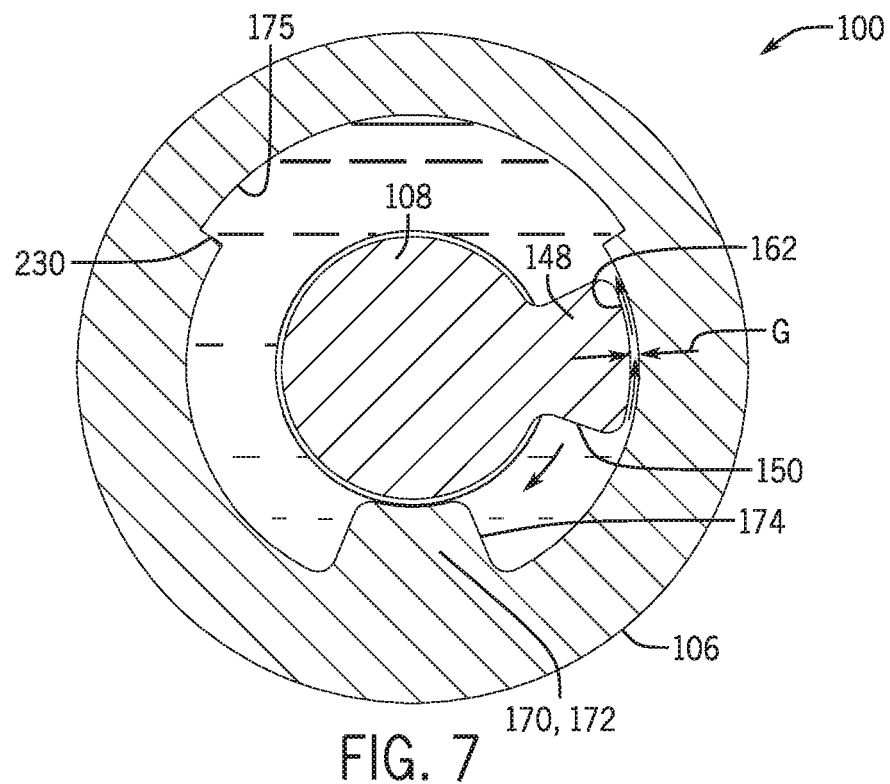
FIG. 7 is a transverse cross-sectional view of the damper of FIG. 3 in an increased damping state adjacent a first end point of travel, FIG. 7 taken along section line B-B of FIG. 3 in accordance with an embodiment of the present disclosure.
Figure 10:
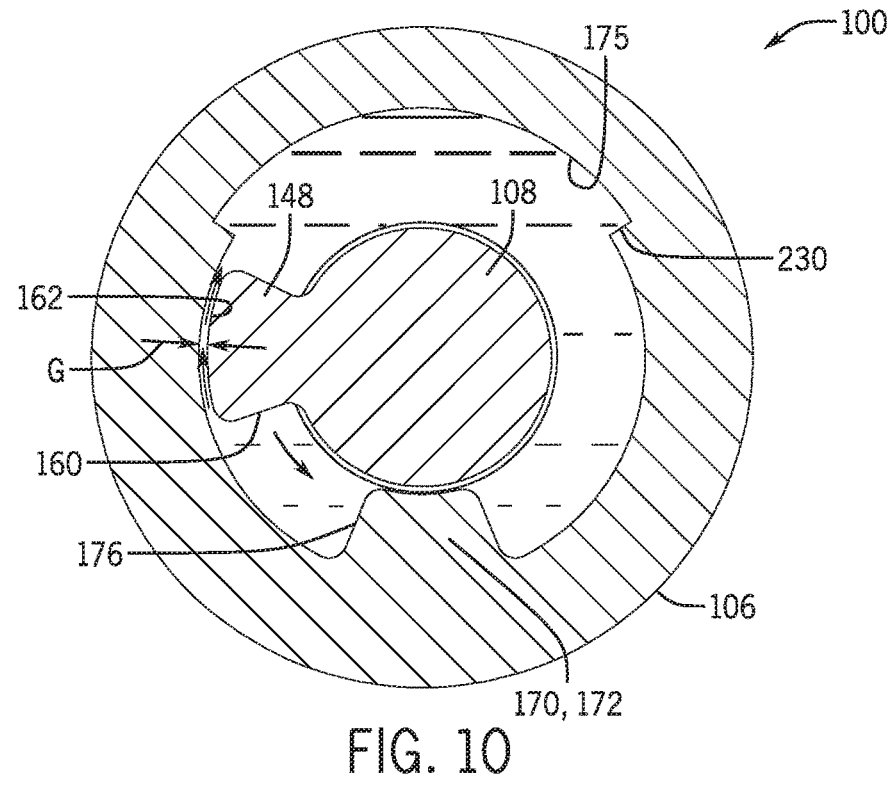
FIG. 10 is a transverse cross-sectional view of the damper of FIG. 3 in an increased damping state adjacent a second end point of travel, FIG. 10 taken along section line B-B of FIG. 3 in accordance with an embodiment of the present disclosure.

With reference to FIGS. 7 and 10, the damper 100 is depicted in a third position, which may correspond to a partially-opened louver position (position B1 or B2 in FIG. 14) or a fully-closed louver position (position C1 or C2 in FIG. 14). FIGS. 7 and 10 do not depict the rotary member 108 in the same rotational position; however, the configurations of the damper 100 in FIGS. 7 and 10 are functionally equivalent, albeit in a mirrored configuration. For example, in the third position, the rotary member 108 and the housing 106 may be oriented such that the outermost surface 162 of the rotary member 108 is in at least partial facing relationship with the transition 230. In this third position, the provided damping rate is increased compared to the first and second positions of FIGS. 5, 6, and 9 because the gap G between the outermost surface 162 of the rotary member 108 and the inner surface 175 of the housing 106 is reduced.

Similar to the description above, rotation of the rotary member 108 in a first direction (clockwise in FIG. 7 and counter-clockwise in FIG. 10) causes fluid to flow in a second direction (counter-clockwise in FIG. 7 and clockwise in FIG. 10) substantially opposite the first direction regardless of which direction the rotary member 108 is rotated. As illustrated in FIGS. 7 and 10, the increased damping rate associated with the decreased or decreasing size of the gap G occurs adjacent the end points of travel of the rotary member 108. The end points of travel of the rotary member 108 may be defined by the rib 172 or another structure to which the damper 100 is associated. In FIGS. 7 and 10, the increased damping rate may occur until, for example, the first abutment surface 150 of the fin 148 contacts the first limit surface 174 of the rib 172 (see FIG. 8) or until the second abutment surface 160 of the fin 148 contacts the second limit surface 176 of the rib 172 (see FIG. 11). In embodiments in which the damper 100 is associated with a shutter panel (such as the shutter panel 236 in FIG. 12), the shutter panel may set the ends of travel of the rotary member 108 of the damper 100. For example, adjacent louvers (e.g., louvers 240 in FIG. 12) of a shutter panel may contact one another to define one or more end points of travel of the louvers (position C1 or C2 in FIG. 14), which in turn may define the end points of travel of the rotary member 108 of the damper 100. These end points of travel of the rotary member 108 may be spaced with distance from the rib 172 (e.g., see the position of the rotary member 108 in FIGS. 7 and 10), thereby ensuring the louvers fully close, without the rotary member 108 interfering with the rib 172, to provide maximum privacy and minimum light passage through the shutter panel.

Figure 8:
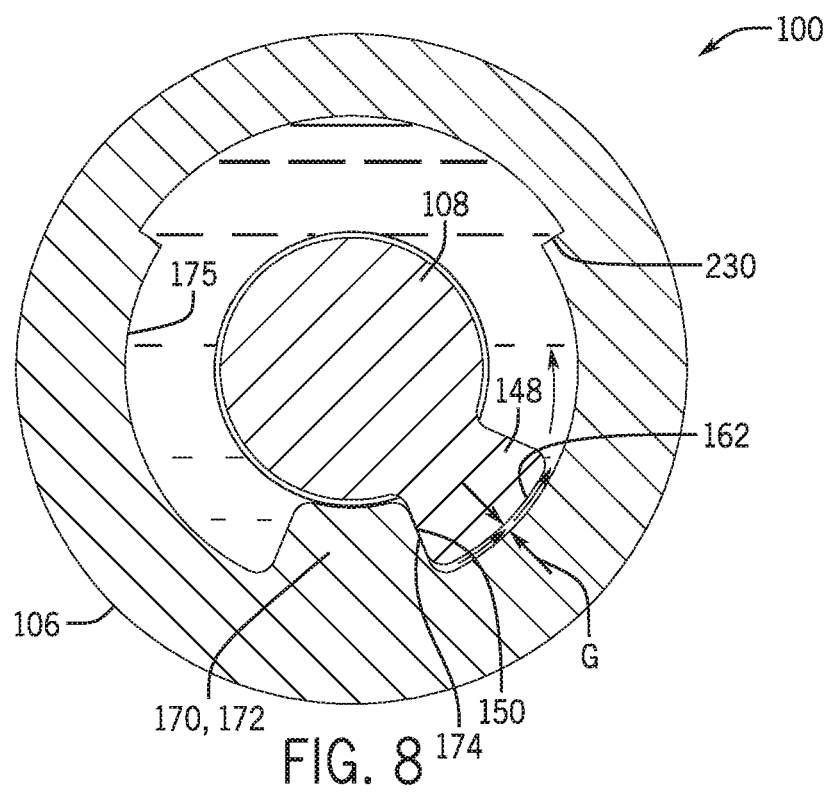
FIG. 8 is a transverse cross-sectional view of the damper of FIG. 3 with a rotary member at a first end point of travel, FIG. 8 taken along section line B-B of FIG. 3 in accordance with an embodiment of the present disclosure.
Figure 11:
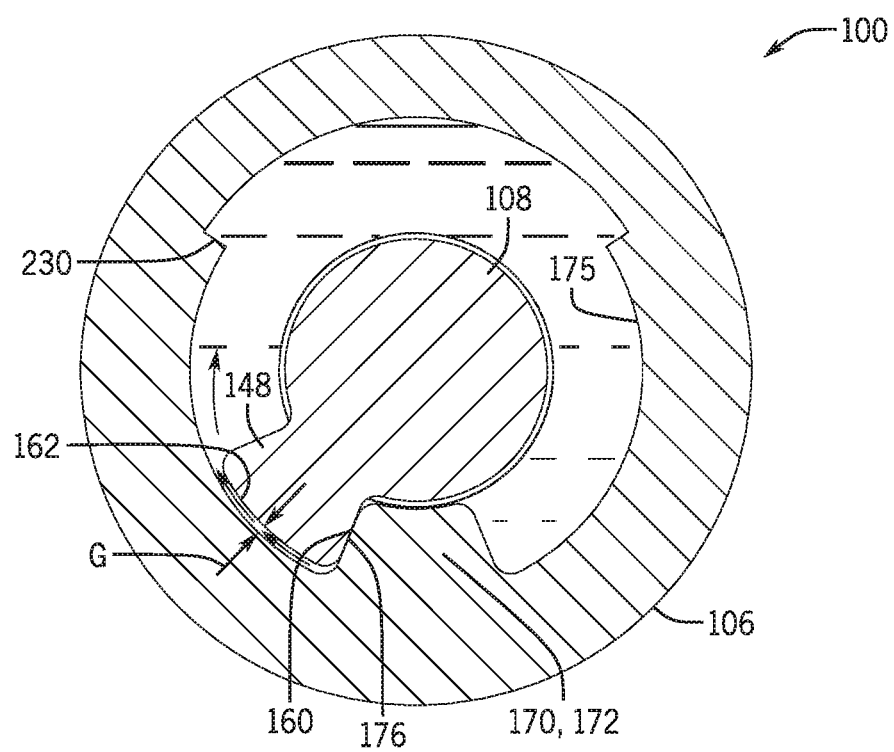
FIG. 11 is a transverse cross-sectional view of the damper of FIG. 3 with a rotary member at a second end point of travel, FIG. 11 taken along section line B-B of FIG. 3 in accordance with an embodiment of the present disclosure.

With reference to FIGS. 8 and 11, the damper 100 is depicted in a fourth position, which may correspond to a fully-closed louver position (position C1 or C2 in FIG. 14). FIGS. 8 and 11 do not depict the rotary member 108 in the same rotational position; however, the configurations of the damper 100 in FIGS. 8 and 11 are functionally equivalent, albeit in a mirrored configuration. For example, in the fourth position, the fin 148 of the rotary member 108 may be in an abutting relationship with the rib 172. For example, the rotary member 108 may be rotated towards a first end point of travel until, for example, the first abutment surface 150 of the fin 148 contacts the first limit surface 174 of the rib 172 (see FIG. 8) to define a first fully-closed louver position, such as position C1 in FIG. 14. With reference to FIG. 11, in like manner, the rotary member 108 may be rotated towards a second end point of travel until, for instance, the second abutment surface 160 of the fin 148 contacts the second limit surface 176 of the rib 172 to define a second fully-closed louver position, such as position C2 in FIG. 14.

Figure 12:
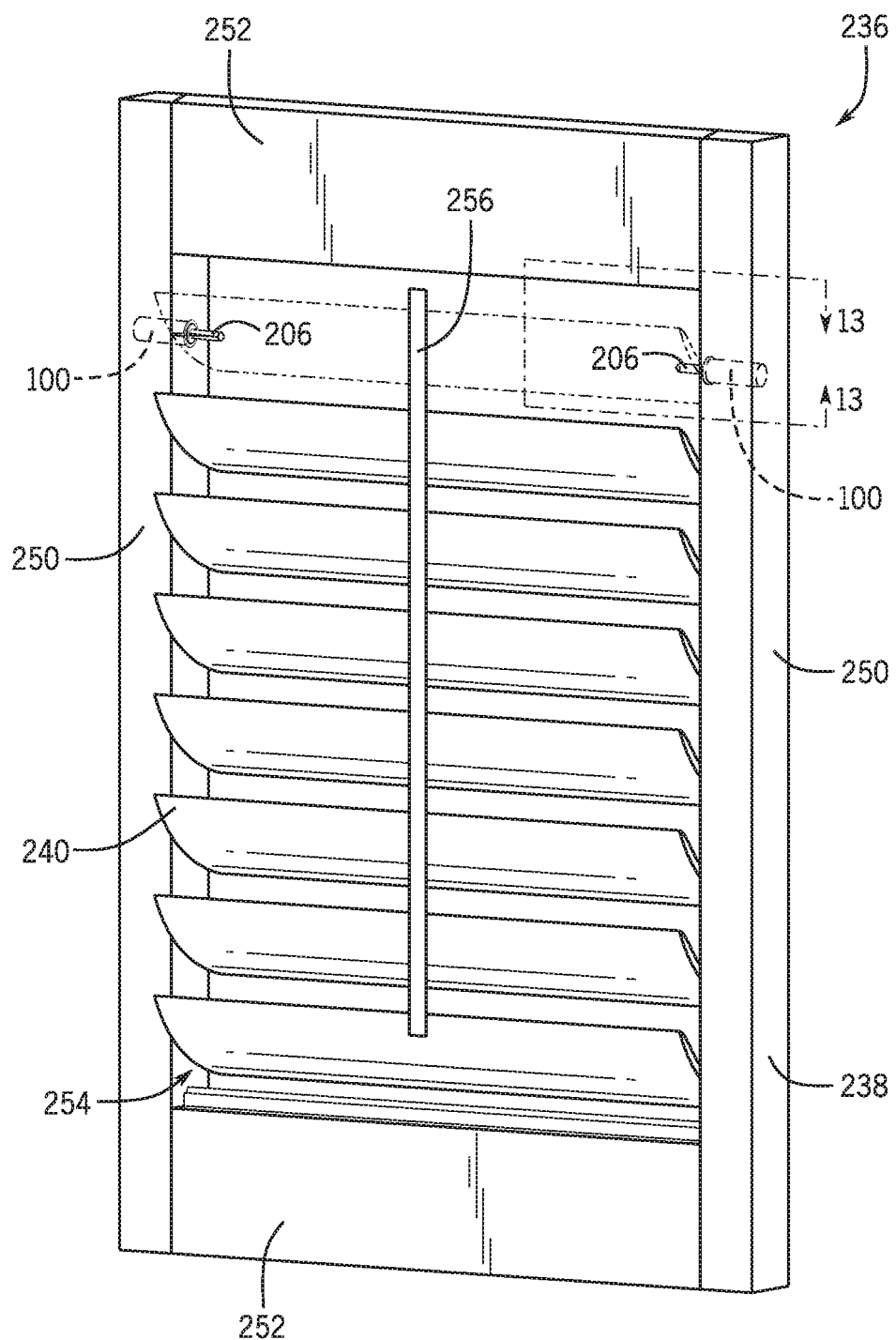
FIG. 12 is a perspective view of a shutter panel in accordance with an embodiment of the present disclosure.

Referring to FIG. 12, the damper 100 may be associated with a shutter panel 236 for an architectural opening. As illustrated in FIG. 12, the shutter panel 236 may include a frame 238 and one or more louvers 240. The frame 238 may include a pair of spaced apart, substantially vertical stiles 250 interconnected together by a pair of spaced apart, substantially horizontal rails 252. Collectively, the stiles 250 and the rails 252 may form a perimeter of the frame 238 and define an interior space 254 configured to receive the louvers 240. Although a rectangular frame is depicted, the frame 238 may be formed in substantially any shape (e.g., square, circular, semi-circular, trapezoidal, etc.) to accommodate various architectural openings.

With continued reference to FIG. 12, the louvers 240 may be positioned within the interior space 254 defined by the frame 238 and may be rotatably coupled to the frame 238.

As illustrated in FIG. 12, the louvers 240 may extend between the stiles 250 in a transverse orientation (e.g., perpendicular) relative to the stiles 250. The louvers 240 may be individually attached to the stiles 250 so that a single louver 240 may be replaced if damaged. Each louver 240 may be rotatable or tiltable about a longitudinal axis of the respective louver 240 between open and closed positions. In a fully-opened position (e.g., position A in FIG. 14), each louver 240 may be positioned substantially perpendicular to the associated architectural opening to provide a minimum amount of privacy and a maximum amount of light passage. In the fully-opened position, immediately adjacent louvers 240 may be separated from each other by a maximum distance. In a fully-closed position (e.g., positions C1 and C2 in FIG. 14), immediately adjacent louvers 240 may contact, overlap, or abut one another to provide a maximum amount of privacy and a minimum amount of light passage. In the fully-closed position, immediately adjacent louvers 240 may be separated from each other by a minimum distance. For shutter panels with two fully-closed positions, each of the fully-closed positions may be associated with an opposite end of travel of a respective louver 240.

As seen in FIG. 12, the louvers 240 may be coupled or grouped together so that the louvers 240 rotate substantially in unison. For example, a tilt bar 256 may be attached to each louver 240 to link the louvers 240 together so that movement of the tilt bar 256 causes a substantially coordinated movement of the louvers 240. Additionally or alternatively, each louver 240 may be operably associated with a gear track system embedded within each stile 250. A slider knob or other actuator may be operably associated with the gear track system to move the louvers 240 in a substantially coordinated manner. Additionally or alternatively, each louver 240 may be operably associated with a pulley system embedded within each stile 250. A slider knob or other actuator may be operably associated with the pulley system to substantially uniformly move the louvers 240.

Figure 13:
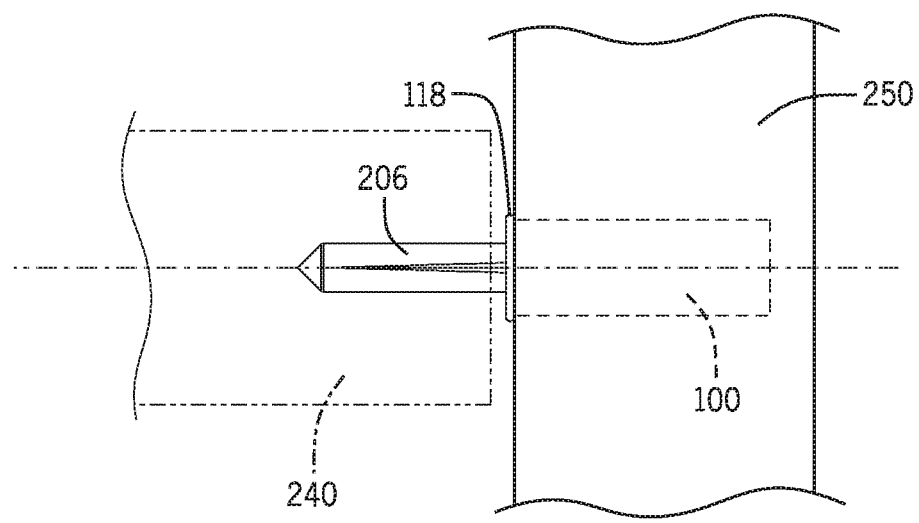
FIG. 13 is an enlarged fragmentary elevation view of the shutter panel of FIG. 12 taken along line 13-13 of FIG. 12 in accordance with an embodiment of the present disclosure.

With reference to FIGS. 12 and 13, one or more louvers 240 may be rotatably attached to the stiles 250 by one or more dampers 100. For example, in the exemplary embodiment of FIG. 12, each end of the louver 240 may be rotatably supported by the damper 100 by, for example, the louver pin 206. In such embodiments, the damper(s) 100 may be operable to variably resist rotation of the louver 240, as described above. As shown, the damper(s) 100 may be received at least partially in the frame 238. For example, one damper 100 may be received within one stile 250 (e.g., a left stile 250), and another damper 100 may be received within another stile 250 (e.g., a right stile 250). In the exemplary embodiment of FIGS. 12 and 13, the damper(s) 100 are substantially aligned along a longitudinal axis of the respective louver 240. In the embodiments of FIGS. 12 and 13, the louver pin 206 is coupled to the damper 100 such that rotation of the louver 240 rotates the rotary member 108 of the damper 100.

With reference to FIG. 14, a single louver 240 is depicted in relation to an upper rail 252A and a lower rail 252B (for clarity purposes only one louver 240 is depicted, although multiple louvers 240 may operate in the same fashion with adjacent louvers 240 contacting each other substantially simultaneously). As depicted in FIG. 14, the louver 240 may be in a fully-opened position when oriented in position A, which, as previously discussed, may correspond to the damper 100 configuration depicted in FIG. 5. Rotating the louver 240 upward or downward toward the upper rail 252A or the lower rail 252B may rotate the louver 240 within a first or lower damping range 258, which may have an angle β. When the louver 240 is positioned within the first damping range 258, the damper 100 applies a lower damping force to the louver 240 to permit relatively unrestricted movement of the louver 240 into different orientations.

Once the louver 240 is rotated to or beyond the angular position B1 or B2, the louver 240 may enter into a second or higher damping range 260, which may correspond to the damper 100 configurations depicted in FIGS. 6-11. When the louver 240 is positioned within the second damping range 260, which may have an angular range θ, the damper 100 applies a higher damping force to the louver 240 to regulate a rate of closure of the louver 240 and reduce noise as the adjacent louvers 240 contact one another.

The angles β and θ may be altered based on different applications, user preferences, and many other factors. For example, the relationship between the fin 148 of the rotary member 108 and the transition 230 of the housing 106 may be altered to change the angles β and θ. With reference to FIG. 5, the angles β and θ may be altered by changing the size (e.g., the length) of the transition 230 and/or altering the position of the transition 230 relative to the rib 172 of the stop 170. For example, by increasing the distance between the rib 172 and the edges 232, the angle β may decrease and the angle θ may increase. By decreasing the distance between the rib 172 and the edges 232, the angle β may increase and the angle θ may increase. Similar changes may be realized by changing the size of the fin 148 of the rotary member 108 or by changing the size of the rib 172 of the stop 170 (compare FIG. 5 and FIG. 18). In some implementations, the angle β is between about 80 degrees and about 120 degrees, and the angle θ is between about 20 degrees and about 45 degrees. In one implementation, the angle β is about 100 degrees and the angle θ is about 45 degrees.

Once the louver 240 is oriented into the fully-closed angular position C1 or C2, which as previously discussed may correspond to the damper 100 configurations depicted in either FIGS. 7 and 10 or FIGS. 8 and 11, the louver 240 may be prevented from rotating further by, for example, the louver 240 contacting an adjacent louver 240 and/or a portion of the shutter panel 236 (e.g., the upper rail 252A and/or the lower rail 252B). Additionally or alternatively, rotation of the louver 240 may be limited by the rotary member 108 contacting the stop 170, as described above with reference to FIGS. 8 and 11. When the louver 240 is positioned in the fully-closed angular position C1 or C2, the louver 240 may be angularly offset from a plane P that bisects the upper and lower rails 252A, 252B (or an adjacent louver 240) by an offset angle φ, which may vary depending on the size of the louver 240 and/or the size of the shutter panel 236 (e.g., the upper rail 252A and/or the lower rail 252B). In some embodiments, the offset angle φ may be between about 4 degrees and about 8 degrees. For instance, the offset angle φ may be about 4 degrees for a 4½" louver 240, may be about 5 degrees for a 3½" louver 240, or may be about 8 degrees for a 2½" louver 240. In some embodiments, the damper 100 may provide an increased damping rate within a range that includes the offset angle φ. That is, the damper 100 may provide an increased damping range of angle θ plus angle φ in relation to either or both ends of travel of a louver 240. Thus, the effective damping range of the louver 240 may be represented as the second damping range 260 having an angular range of θ.

Although FIGS. 12 and 13 illustrate the damper 100 associated with a louver 240 of a shutter panel 236, the damper 100 of the present disclosure can be utilized on different coverings where controlled damping about a longitudinal axis is desired. For example, the damper 100 may be applied to vertical or horizontal vanes or other vane and covering structures that rotate about a longitudinal axis between positions (e.g., between open and closed configurations).

Figure 16:
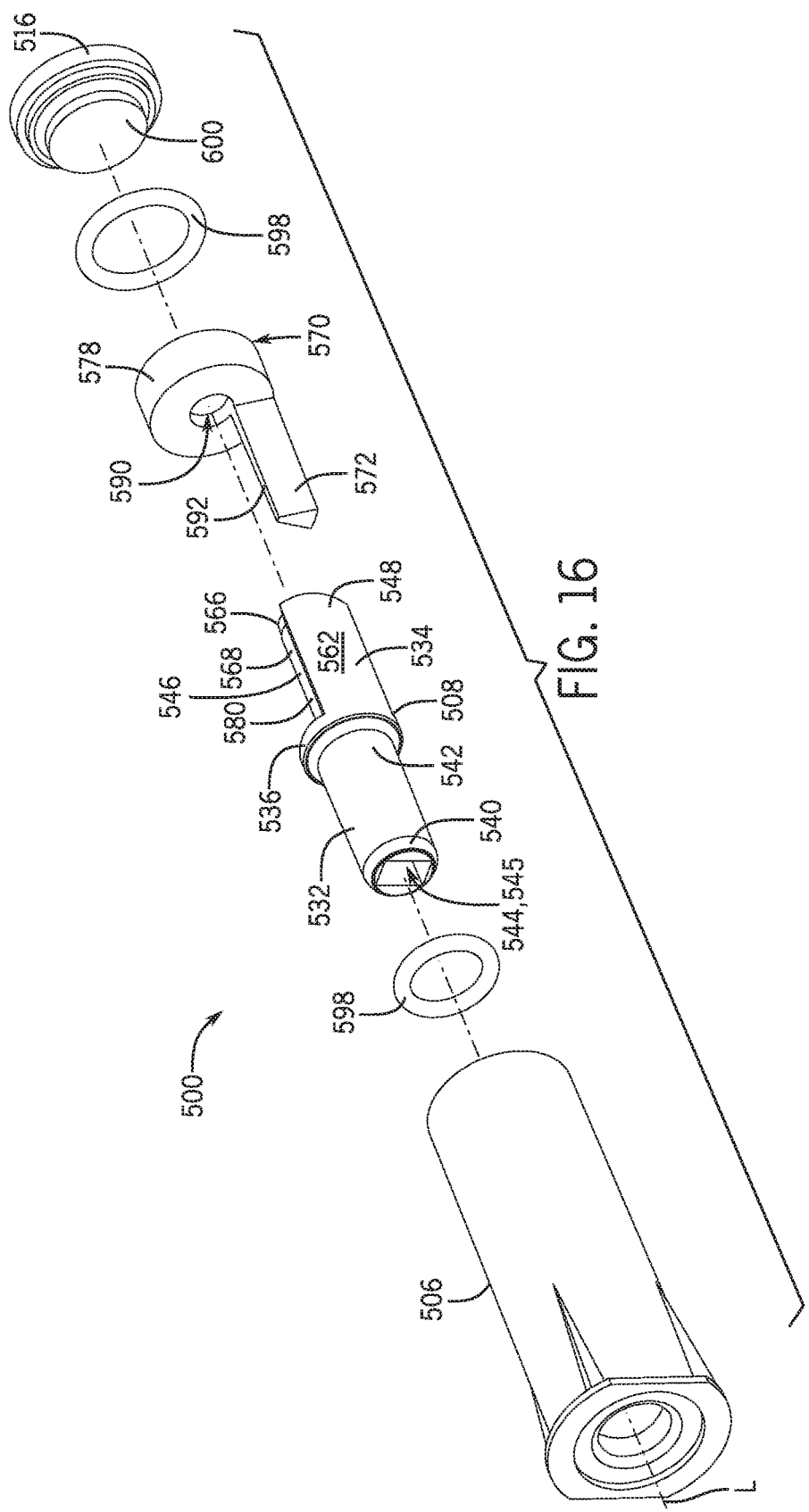
FIG. 16 is an exploded view of the damper of FIG. 15 in accordance with an embodiment of the present disclosure.
Figure 17:
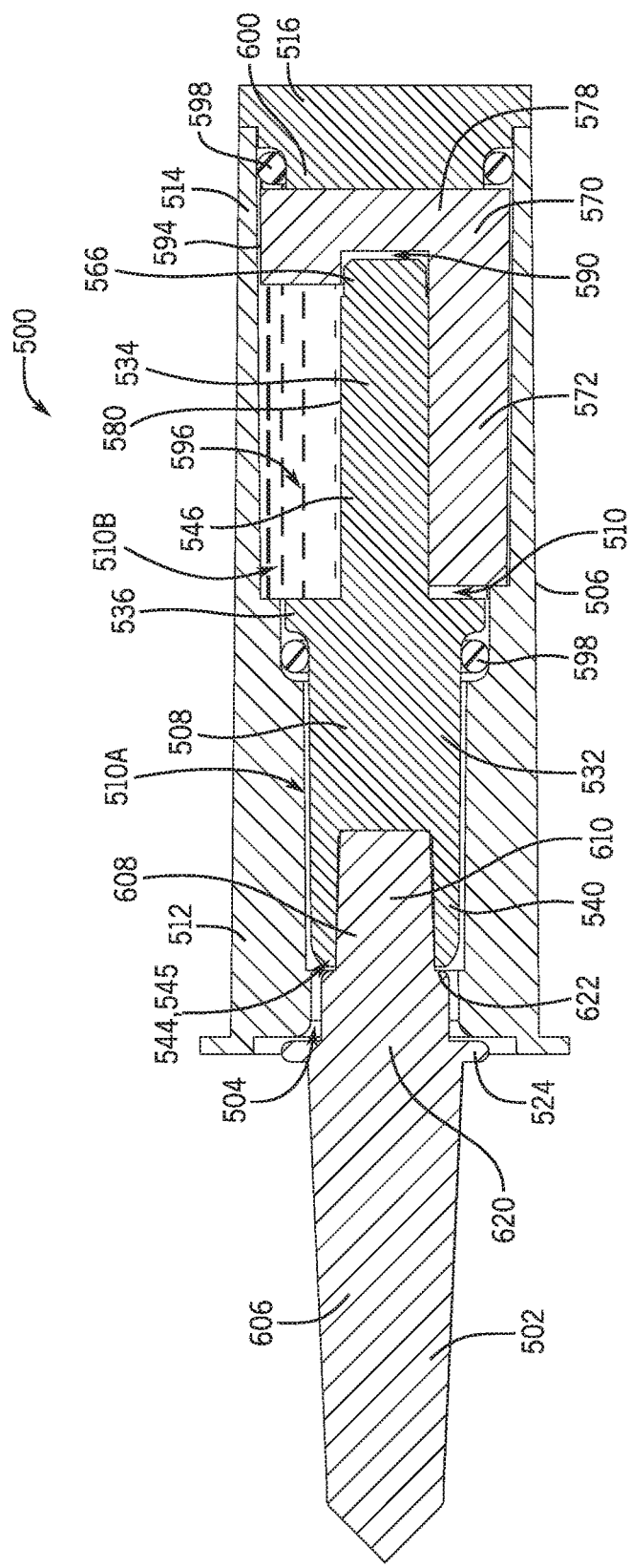
FIG. 17 is an axial cross-sectional view of the damper of FIG. 15 with a drive member associated therewith, FIG. 17 taken along section line 17-17 of FIG. 15 in accordance with an embodiment of the present disclosure.

FIGS. 15-18 represent an additional embodiment of a damper 500. With the exception of the description below, the damper 500 is similar to the damper 100 and its associated description above. For ease of reference, like structure is represented with appropriately incremented reference numbers. With reference to the embodiments of FIGS. 15-17, the housing 506 may be formed as an elongate tube having open ends for insertion of the external component 502 into one end (e.g., the first end 512) of the housing 506 and for insertion of the rotary member 508 into the other end (e.g., a second end 514) of the housing 506 for interfacing with the external component 502. An end cap 516 may close a second end 514 of the housing 506 opposite the first end 512. In such embodiments, the end cap 516 may be secured to the second end 514 of the housing 506 via threaded engagement, fasteners, adhesive, heat or sonic welding, or any other suitable securing mechanism. With reference to FIG. 17, the first end 512 of the housing 506 may remain open for receiving the external component 502.

As shown in FIGS. 16 and 17, the engagement structure 544 of the rotary member 508 may be a receptacle 545 defined in the first end 540 of the rotary member 508. In such embodiments, the receptacle 545 may receive a complimentary-sized portion of the external component 502 to cause the rotary member 508 and the external component 502 to rotate in unison for the same purposes as explained above. For example without limitation, the engagement portion 608 of the louver pin 606 may be stepped and include a first region 610 and a second region 620. A transition between the first and second regions 610, 620 may define a limit wall 622 that abuts against the first end 540 of the rotary member 508 to define a seated position of the louver pin 606 within the damper 500. As illustrated in FIG. 17, the second region 620 of the engagement portion 608 of the louver pin 606 may be rotatably received in the opening 504 formed in the housing 506, and the first region 610 of the engagement portion 608 of the louver pin 606 may be received within the receptacle 545 formed in the rotary member 508 such that rotation of the louver pin 606 causes the rotary member 508 to rotate correspondingly. In some embodiments, the limit flange 524 may include dimensions larger than the opening 504 of the housing 506 to further limit the louver pin 606 from being over-inserted into the damper 500.

Figure 18:
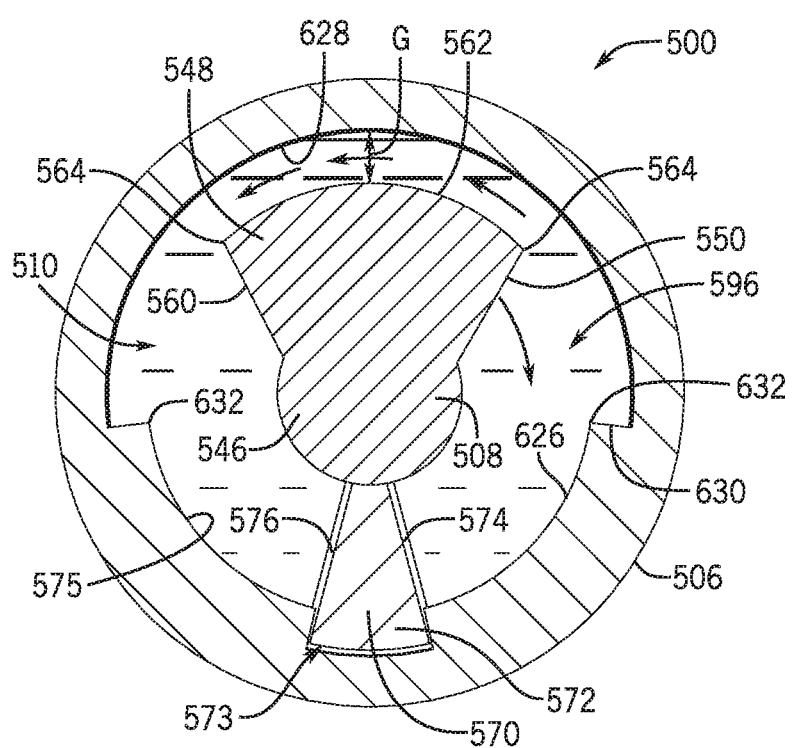
FIG. 18 is a transverse cross-sectional view of the damper of FIG. 15 in a reduced damping state, FIG. 18 taken along section line 18-18 of FIG. 15 in accordance with an embodiment of the present disclosure.

Turning to FIGS. 17 and 18, the rib 572 may be mounted to the housing 506 and project radially inwardly into the rotational path of the rotary member 508. For example, the rib 572, which may be stationary, may be received at least partially within a groove 573 defined in the inner surface 575 of the housing 506 to, for example, rotationally constrain the stop 570 within the housing 506 (see FIG. 18). In such embodiments, the engagement of the rib 572 within the groove 573 limits movement of the rib 572 such that the end points of travel are defined. In one embodiment, the engagement between the rib 572 and the inner surface 575 of the housing 506 may resemble a dovetail joint. As best seen in FIG. 18, the rib 572 may be tapered in cross-section to interlock with the groove 573 that is correspondingly shaped. In such embodiments, the engagement between the rib 572 and the inner surface 575 of the housing 506 may limit movement of the rib 572 away from the groove 573. Additionally or alternatively, the rib 572 may be attached to the inner surface 575 of the housing 506 such as through adhesive, mechanical fasteners, heat or sonic welding, or the like.

Referring to FIGS. 16 and 17, the stop 570 may include a disc 578 attached to an end of the rib 572. The disc 578 may be axially aligned with the cylindrical shaft 546 of the rotary member 508, and the rib 572 may be offset laterally from a longitudinal axis of the disc 578 such that the rib 572 extends lengthwise along the outer surface 580 of the shaft 546. The disc 578 may define the bearing cavity 590 that receives the boss 566 of the rotary member 508 to rotatably support at least the second portion 534 of the rotary member 508. As illustrated in FIG. 17, the disc 578 may be received within the housing 506 and may include an outer surface 594 sized to substantially match an outer diameter of the cavity 510. Like the rotary member 508, the disc 578 and the end cap 516 may be aligned along the longitudinal axis L of the damper 100 (see FIG. 16).

As illustrated in FIG. 17, to seal the fluid-filled cavity 596, a pair of O-rings 598 may be inserted within the housing 506 on either end of the fluid-filled cavity 596. For example, one O-ring 598 may be positioned on the first portion 532 of the rotary member 508 adjacent the partition 536 such that the O-ring 598 is in sealing engagement between the housing 506 and the rotary member 508. The end cap 516 may include a plug portion 600 that extends within the housing 506. In such embodiments, another O-ring 598 may be positioned on the plug portion 600 such that the O-ring 598 is in sealing engagement between the housing 506 and the plug portion 600 of the end cap 516.

The foregoing description has broad application. It should be appreciated that the concepts disclosed herein may apply to many types of architectural coverings, in addition to the coverings described and depicted herein. For example, the concepts may apply equally to vertical shades or any other shade having a component that would benefit from variable damping rates as the component rotates about a longitudinal axis. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A shutter panel for an architectural opening, comprising:
    a frame;
    a louver rotatably coupled to said frame by at least one louver pin, said louver being rotatable relative to said frame across an angular range of travel; and
    a damper operably associated with said louver and configured to variably resist rotation of said louver, said damper comprising:
        a housing defining a fluid-filled cavity; and
        a rotary member rotatably received at least partially in said cavity and rotatable across said angular range of travel between first and second end points, said rotary member including an outermost surface spaced inwardly from an inner surface of said housing defined between said first and second end points to define a gap therebetween;
    wherein:
        said gap varies in dimension depending on a rotational position of said rotary member such that said gap defines first and second damping regions adjacent to said first and second end points, respectively, and a third damping region extending between said first and second damping regions along said angular range of travel of said louver;
        a damping rate of said rotary member is greater along said first and second damping regions than along said third damping region; and
        fluid is disposed between said outermost surface of said rotary member and said inner surface of said housing.

2. The shutter panel of claim 1, wherein said at least one louver pin is coupled to said rotary member such that rotation of said louver rotates said rotary member.

3. The shutter panel of claim 1, wherein:
    said gap is decreased in dimension along said first and second damping regions as compared to said third damping region to provide an increased damping rate adjacent to said first and second end points; and
    said first and second end points correspond to first and second fully closed positions of said louver.

4. The shutter panel of claim 1, wherein said damper is received at least partially in said frame.

5. The shutter panel of claim 1, wherein:
    said inner surface of said housing includes a first portion positioned along said first and second damping regions that is defined by a first radius and a second portion positioned along said third damping region that is defined by a second radius;

said first radius is smaller than said second radius; and said damper includes a rib projecting inwardly from said first portion of said inner surface.

6. The shutter panel of claim 5, wherein said rib extends between said first and second damping regions.

7. The shutter panel of claim 1, wherein:

said first and second end points are defined by a rib projecting inwardly from said inner surface of said housing; and said rib supports at least a portion of said rotary member for rotation relative thereto within said housing.

8. The shutter panel of claim 7, wherein said rib defines a bearing surface across which said at least a portion of said rotary member is slidably engaged as said rotary member is rotated within said housing.

9. The shutter panel of claim 1, wherein said inner surface is stepped at both a first transition defined between said first damping region and said third damping region and a second transition defined between said second damping region and said third damping region.

10. The shutter panel of claim 9, wherein said inner surface defines one of a sharp edge or a rounded edge at each of said first and second transitions.

11. The shutter panel of claim 9, wherein:

an edge is defined at each of said first and second transitions; and said edge corresponds to a sharp edge.

12. The shutter panel of claim 11, wherein:

said outermost surface of said rotary member is bounded by first and second leading edges; and each of said first and second leading edges defines a rounded profile.

13. The shutter panel of claim 9, wherein:

said stepped inner surface includes a first portion positioned along said first and second damping regions that is defined by a first radius and a second portion positioned along said third damping region that is defined by a second radius; and said first radius is less than said second radius.

14. The shutter panel of claim 13, further comprising a rib projecting inwardly from said first portion of said inner surface.

15. The shutter panel of claim 14, wherein said rib projects inwardly from a middle of said first portion.

16. The shutter panel of claim 9, wherein said outermost surface of said rotary member is defined by a constant radius.

17. The shutter panel of claim 1, further comprising a stop defining said first and second end points.

18. The shutter panel of claim 17, wherein said stop supports at least a portion of said rotary member for rotation relative thereto within said housing.

19. The shutter panel of claim 1, further comprising a single stationary rib that prevents full circular movement of said rotary member within said housing.

20. The shutter panel of claim 1, further comprising a drive member coupled to said rotary member, said drive member projecting axially from an end of said housing.

21. The shutter panel of claim 1, wherein said third damping region corresponds to a greater portion of said angular range of travel than said first and second damping regions.

22. The shutter panel of claim 1, wherein said first and second damping regions each correspond to between 20 degrees and 45 degrees of said angular range of travel of said louver and said third damping region corresponds to between 80 and 120 degrees of said angular range of travel of said louver.

* * * * *